United States Patent
Imai et al.

(10) Patent No.: US 6,608,456 B2
(45) Date of Patent: Aug. 19, 2003

(54) MOTOR CONTROL APPARATUS

(75) Inventors: Nobuyuki Imai, Wako (JP); Toshinori Tsukamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/073,905

(22) Filed: Feb. 14, 2002

(65) Prior Publication Data

US 2002/0149330 A1 Oct. 17, 2002

(30) Foreign Application Priority Data

Feb. 16, 2001 (JP) ........................................ 2001-040445

(51) Int. Cl.[7] ............................................... H02P 1/18
(52) U.S. Cl. ........................ 318/254; 318/609; 318/610; 318/439; 318/138
(58) Field of Search ................................ 318/254, 138, 318/439, 609–611, 615, 632, 432, 474

(56) References Cited

U.S. PATENT DOCUMENTS

| | | | | |
|---|---|---|---|---|
| 4,808,903 A | * | 2/1989 | Matsui et al. | 318/800 |
| 4,958,117 A | * | 9/1990 | Kerkman et al. | 318/52 |
| 5,329,217 A | * | 7/1994 | Kerkman et al. | 318/811 |
| 5,400,240 A | * | 3/1995 | Araki | 363/97 |
| 5,656,911 A | * | 8/1997 | Nakayama et al. | 318/718 |
| 5,841,263 A | * | 11/1998 | Kaneko et al. | 318/807 |
| 6,018,225 A | * | 1/2000 | Garces | 318/798 |
| 6,407,531 B1 | * | 6/2002 | Walters et al. | 318/805 |

* cited by examiner

Primary Examiner—Robert E. Nappi
Assistant Examiner—Rina I. Duda
(74) Attorney, Agent, or Firm—Arent Fox Kintner Plotkin & Kahn, PLLC

(57) ABSTRACT

An integral term component generating unit 21 integrates a d-axis current difference $\Delta Id$ and a q-axis current difference $\Delta Iq$ using an integral gain Ki which is determined to stabilize a system where the d-axis current difference $\Delta Id$ and the q-axis current difference $\Delta Iq$ are multiplied by the integral gain Ki, integrated, and inputted, with respect to a steady gain M which approximates, including proportional gains Kp, the steady input-to-output relationship of a motor 2 to which the voltage applied to a d-axis armature and the voltage applied to a q-axis armature are inputted and from which the current flowing through the d-axis armature and the current flowing through the q-axis armature are outputted, thereby a d-axis integral term component Vd_i which is an integral term component of a d-axis command voltage Vd_c and a q-axis integral term component Vq_i which is an integral term component of a q-axis command voltage Vq_c are generated.

4 Claims, 3 Drawing Sheets

MOTOR CONTROL APPARATUS

BACKGROUND OF THE INVENTION

1. Field of the Invention

The present invention relates to a motor control apparatus for controlling currents flowing through the armatures of a DC brushless motor according to a feedback control process.

2. Description of the Related Art

One conventional method of controlling a DC brushless motor employs a vector control process (hereinafter referred to as "dq control process") which converts a 3-phase (U, V, W) DC brushless motor into an equivalent circuit having a q-axis armature on a q-axis which is aligned with the direction of magnetic fluxes of field systems on the rotor of the motor and a d-axis armature on a d-axis which extends perpendicularly to the q-axis.

A conventional motor control apparatus for carrying out the dq control process is arranged as shown in FIG. 3 of the accompanying drawings. As shown in FIG. 3, a motor control apparatus 50 serves to control currents flowing through the armatures of a DC servomotor 51, and has a U-phase current sensor 52 for detecting a current IU_s flowing through a U-phase armature of the DC servomotor 51 and a W-phase current sensor 53 for detecting a current IW_s flowing through a W-phase armature of the DC servomotor 51.

The currents IU_s, IW_s and an electric angle θ of the rotor of the motor 51 which is detected by a position detecting sensor (resolver or the like) 54 are supplied to a 3-phase/dq converter 55, which outputs an actual current Id_s flowing through the d-axis armature and an actual current Iq_s flowing through the q-axis armature.

The motor control apparatus 50 is supplied with a command value Id_c for the current flowing through the d-axis armature and a command value Iq_c for the current flowing through the q-axis armature. A first subtractor 56 calculates the difference ΔId between the command value Id_c and the actual current Id_s, and a second subtractor 57 calculates the difference ΔIq between the command value Iq_c and the actual current Iq_s.

A first PI processor 58 and a second PI processor 59 perform a proportional and integral (PI) process to reduce the differences ΔId, ΔIq, and calculate a command value Vd_c for the voltage applied to the d-axis armature and a command value Vq_c for the voltage applied to the q-axis armature, respectively. The command values Vd_c, Vq_c are supplied to a dq/3-phase converter 60, which converts them into command values VU_c, VV_c, VW_c for the voltages applied to the three-phase (U, V, W) armatures. A power drive unit 61 applies voltages according to the command values VU_c, VV_c, VW_c to the three-phase armatures of the motor 51.

The process carried out by the first PI processor 58 and the second PI processor 59 is expressed by the following equation (1):

$$\begin{bmatrix} Vd \\ Vq \end{bmatrix} = \begin{bmatrix} Kp\Delta Id + Ki \int \Delta Id \, dt + \omega Ke \\ Kp\Delta Iq + Ki \int \Delta Iq \, dt \end{bmatrix} \quad (1)$$

where Vd: the voltage applied to the d-axis armature, Vq: the voltage applied to the q-axis armature, Kp: the proportional gain, Ki: integral gain, ω: the angular velocity of the motor, and Ke: the induced voltage constant.

In the applications of many motors, sufficient stability and responsiveness is achieved by the feedback control process of the above general proportional and integral control system. However, when the motor is operated at high rotational speeds, the motor may operate unstably or the control responsiveness may become insufficient under the control of the general proportional and integral control system.

The primary reason for the above drawbacks is considered to reside in that since the state equation of the proportional and integral control system is given as the following equation (2), when the motor operates at a high rotational speed, interference between the d- and q-axes increases due to the induced voltage generated depending on the angular velocity ω of the motor, causing the control system to respond in a vibrating fashion.

$$\frac{d}{dt}\begin{bmatrix} Id \\ Iq \end{bmatrix} = \begin{bmatrix} -\frac{r+Kp}{Ld} & \omega \frac{Lq}{Ld} \\ -\omega \frac{Ld}{Lq} & -\frac{r+Kp}{Lq} \end{bmatrix} \quad (2)$$

$$\begin{bmatrix} Id \\ Iq \end{bmatrix} - \begin{bmatrix} \frac{Ki}{Ld}\int Id \cdot dt \\ \frac{Ki}{Lq}\int Iq \cdot dt \end{bmatrix} - \begin{bmatrix} \frac{r}{Ld} & 0 \\ 0 & -\frac{r}{Lq} \end{bmatrix}\begin{bmatrix} Id\_c \\ Iq\_c \end{bmatrix}$$

where Id: the current flowing through the d-axis armature, Iq: the current flowing through the q-axis armature, Ld: the inductance of the d-axis armature, Lq: the inductance of the q-axis armature, and r: the resistance of the d-axis armature and the q-axis armature.

SUMMARY OF THE INVENTION

According to the present invention, there is provided a motor control apparatus for converting a DC brushless motor into an equivalent circuit having a q-axis armature on a q-axis which is aligned with the direction of magnetic fluxes of field systems of the motor and a d-axis armature on a d-axis which extends perpendicularly to the q-axis, comprising current detecting means for detecting currents flowing through armatures of the motor, actual current calculating means for calculating a q-axis actual current flowing through the q-axis armature and a d-axis actual current flowing through the d-axis armature from the currents detected by the current detecting means, and current difference calculating means for calculating a q-axis current difference between a q-axis command current which is a command value for the current flowing through the q-axis armature and the q-axis actual current and a d-axis current difference between a d-axis command current which is a command value for the current flowing through the d-axis armature and the d-axis actual current, means for generating a d-axis command voltage which is a command value for the voltage applied to the d-axis armature and a q-axis command voltage which is a command value for the voltage applied to the q-axis armature in order to reduce the d-axis current difference and the q-axis current difference, and means for controlling the currents flowing through the armatures of the motor depending on the d-axis command voltage and the q-axis command voltage.

The motor control apparatus comprises proportional term component generating means for carrying out a proportional process to multiply the d-axis current difference and the q-axis current difference by respective predetermined proportional gains to generate a d-axis proportional term component which is a proportional term component of the d-axis command voltage and a q-axis proportional term component which is a proportional term component of the q-axis command voltage, integral term component generating means for effecting an integrating process on the d-axis current difference and the q-axis current difference based on a predetermined integral gain to generate a d-axis integral term component which is an integral term component of the d-axis command voltage and a q-axis integral term component which is an integral term component of the q-axis command voltage, and command voltage generating means for generating the d-axis command voltage depending on the sum of the d-axis proportional term component and the d-axis integral term component, and the q-axis command voltage depending on the sum of the q-axis proportional term component and the q-axis integral term component, means for setting the integral gain to stabilize a system in which the d-axis current difference and the q-axis current difference are multiplexed, integrated, and inputted, with respect to a steady gain which approximates, including the proportional gains, the steady input-to-output relationship of the motor to which the voltage applied to the d-axis armature and the voltage applied to the q-axis armature are inputted and from which the current flowing through the d-axis armature and the current flowing through the q-axis armature are outputted.

With the above arrangement, the proportional term component generating means generates the d-axis proportional term component and the q-axis proportional term component. In order to increase the ability of the d-axis actual current to follow the d-axis command current and the ability of the q-axis actual current to follow the q-axis command current to control the motor stably when the motor operates at a high rotational speed, it is necessary to increase the proportional gain thereby to increase the reaponse of the motor to the d-axis command voltage and the q-axis command voltage.

However, only increasing the proportional gain poses a problem in that the motor tends to vibrate in its operation. According to the present invention, therefore, the integral term component generating means generates the d-axis integral term component and the q-axis integral term component in order to alleviate the above shortcoming.

Specifically, the integral term component generating means performs the integrating process based on the integral gain that is set to stabilize the system in which the d-axis current difference and the q-axis current difference are multiplexed, integrated, and inputted, with respect to the steady gain which approximates, including the proportional gains, the steady input-to-output relationship between the voltage applied to the d-axis armature and the voltage applied to the q-axis armature and the current flowing through the d-axis armature and the current flowing through the q-axis armature, thereby generating the d-axis integral term component and the q-axis integral term component.

Stability of the integrating process using the steady gain will be described below with reference to FIG. 2(a). A steady gain M which approximates the input-to-output relationship of a system (2-input, 2-output system) to which a voltage Vd applied to a d-axis armature and a voltage Vq applied to a q-axis armature are inputted and from which a current Id flowing through the d-axis armature and a current Iq flowing through the q-axis armature are outputted, is multiplied by the difference ΔId between a command current value Id_c for the d-axis armature and the current Id and the difference ΔIq between a command current value Iq_c for the q-axis armature and the current Iq, and the products are integrated (Ki, 1/s) to generate a voltage Vd applied to the d-axis armature and a voltage Vq applied to the q-axis armature. In this case, variations in the differences ΔId, ΔIq are suppressed by the integrating process.

Therefore, if an integral gain Ki for stabilizing an output produced by multiplying the steady gain M by the current differences ΔId, ΔIq and integrating products is used, the system ranging from a subtractor 30 to the output of the steady gain M is stabilized as a whole, allowing the current Id to follow the command current value Id_c stably and also allowing the current Iq to follow the command current value Iq_c stably.

Thus, the integral term component generating means performs the integrating process based on the integral gain determined to stabilize the system based on the steady gain, thereby generating the d-axis integral term component and the q-axis integral term component. The d-axis command voltage is generated based on the sum of the d-axis integral term component and the d-axis proportional term component, and the q-axis command voltage is generated based on the sum of the q-axis integral term component and the q-axis proportional term component. In this manner, the system approximated by the steady gain is stabilized to control the motor stably with a good follow-up capability even when the motor operates at high rotational speeds.

Since the electric response of the motor is very quick, if the motor follows the d-axis command voltage and the q-axis command voltage at all times, then the steady gain in the steady state of the system can be expressed by the equation (3) shown below, and the input-to-output relationship can be expressed by the equation (4) shown below. The integral gain can be determined using the steady gain expressed by the equation (3).

$$M = \begin{bmatrix} r+Kp & -\omega Lq \\ \omega Ld & r+Kp \end{bmatrix}^{-1} \tag{3}$$

where M: the steady gain, r: the resistance of the d-axis armature and the q-axis armature, Kp: the proportional gains, Ld: the inductance of the d-axis armature, and Lq: the inductance of the q-axis armature;

$$\begin{bmatrix} Id \\ Iq \end{bmatrix} = \begin{bmatrix} r+Kp & -\omega Lq \\ \omega Ld & r+Kp \end{bmatrix}^{-1} \begin{bmatrix} Vd \\ Vq \end{bmatrix} \equiv M \begin{bmatrix} Vd \\ Vq \end{bmatrix} \tag{4}$$

where Id: the current flowing through the d-axis armature, Iq: the current flowing through the q-axis armature, ω: the angular velocity of the motor, Vd: the voltage applied to the d-axis armature, and Vq: the voltage applied to the q-axis armature.

Inasmuch as the steady gain M expressed by the equation (3) is a regular matrix, if the integral gain is established according to the equation (5) shown below using an arbitrary stable matrix S, then the state equation of an output (voltage) x according to an integrating process using the steady gain is indicated as the equation (6) shown below. The stable matrix is a matrix where the real parts of intrinsic values are all negative. If the system matrix (−KiM) in the equation (6) is a stable matrix, then the state of the output x according to the above state equation is stable.

$$Ki = -\det M \cdot M^{-1} S \equiv \begin{pmatrix} k11 & k12 \\ k21 & k22 \end{pmatrix} \tag{5}$$

where Ki: the integral gain, and S: a predetermined arbitrary stable matrix.

$$\frac{d}{dt}x = -KiM \cdot x = -\det M \cdot M^{-1} SM \cdot x \tag{6}$$

Since detM>0 and $M^{-1}SM$ is a stable matrix in the equation (6), if the integral gain is determined according to the equation (5), then the system matrix (−KiM) is also stable matrix, stabilizing the state of the output x.

The integral term component generating means calculates the d-axis integral term component according to the equation (7) shown below and the q-axis integral term component according to the equation (8) shown below in the integrating process based on the integral gain.

$$Vd\_i = \int (k11 \cdot \Delta Id + k12 \cdot \Delta Iq) dt \quad (7)$$

$$Vq\_i = \int (k21 \cdot \Delta Id + k22 \cdot \Delta Iq) dt \quad (8)$$

where Vd_i: the d-axis integral term component, Vq_i: the q-axis integral term component, and k11, k12, k21, k22: matrix elements of the integral gain Ki defined by the equation (5).

If the integral gain is established according to the equation (9) shown below using an arbitrary positive definite matrix Q, then the state equation of an output (voltage) x according to an integrating process using the steady gain M expressed by the equation (3) is indicated as the equation (10) shown below. The positive definite matrix is a symmetrical real matrix where the intrinsic values are all positive. If the system matrix $(-M^T Q M)$ in the equation (10) is a stable matrix, then the state of the output x is stable.

$$Ki = M^T Q \equiv \begin{pmatrix} k11 & k12 \\ k21 & k22 \end{pmatrix} \quad (9)$$

where Q: a predetermined arbitrary positive definite matrix.

$$\frac{d}{dt} x = -KiM \cdot x = -M^T QM \cdot x \quad (10)$$

In the equation (10), because $(M^T QM)$ is a positive definite matrix, $(-M^T QM)$ is a stable matrix. Therefore, the state of the output x can be stabilized by determining the integral gain according to the equation (9).

The integral term component generating means calculates the d-axis integral term component according to the equation (7) and the q-axis integral term component according to the equation (8), using the integral gain Ki determined by the equation (9) in the integrating process based on the integral gain.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
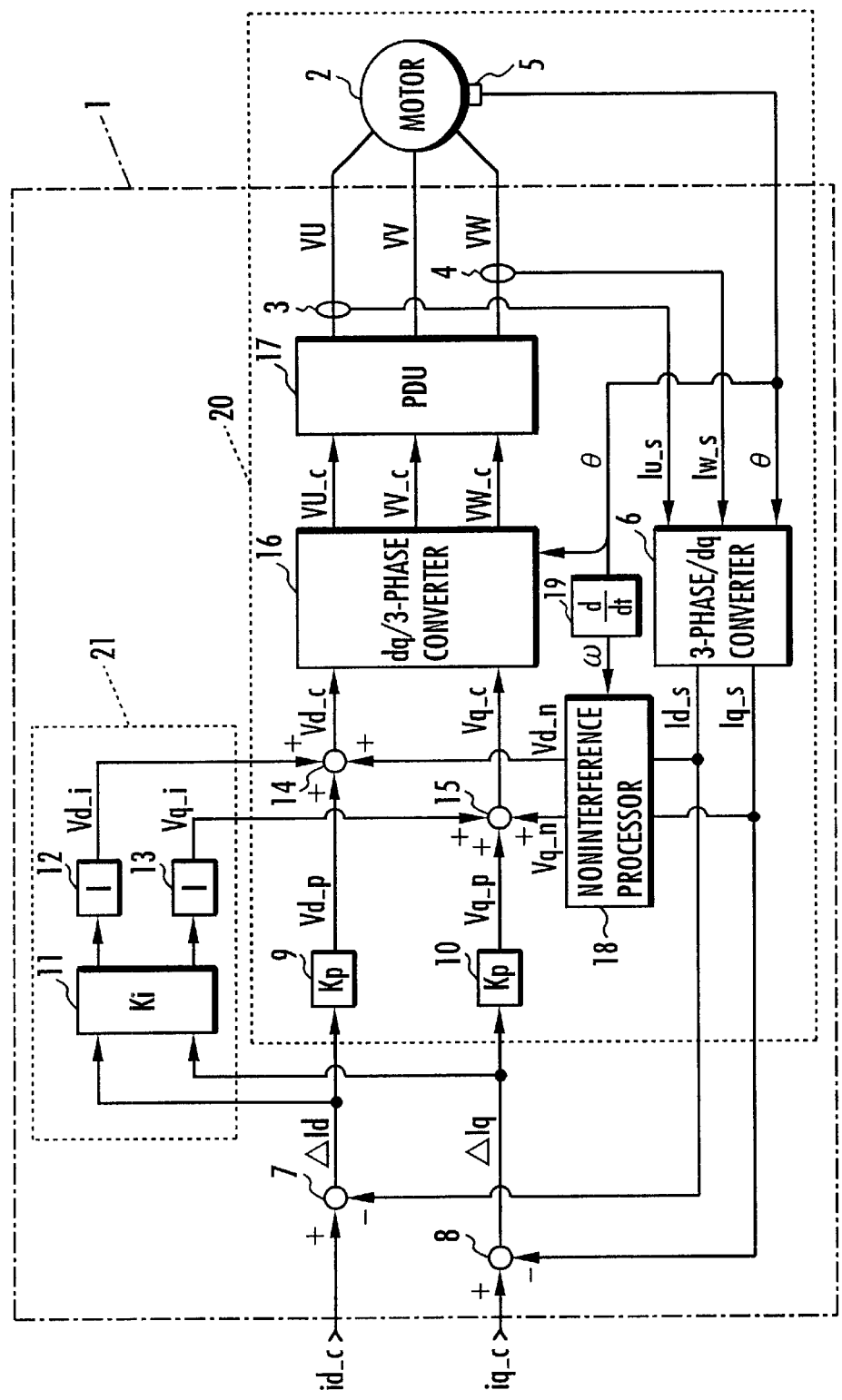
FIG. 1 is a block diagram of a motor control apparatus according to the present invention.

As shown in FIG. 1, a motor control apparatus 1 according to the present invention converts a 3-phase (U, V, W) DC brushless motor 2 (hereinafter referred to as "motor 2") into an equivalent circuit having a q-axis armature on a q-axis which is aligned with the direction of magnetic fluxes of field systems on the rotor (not shown) of the motor 2 and a d-axis armature on a d-axis which extends perpendicularly to the q-axis, and controls currents flowing through the armatures of the motor 2 according to a feedback control process.

The motor control apparatus 1 has a U-phase current sensor 3 (corresponding to a current detecting means) for detecting a current IU_s flowing through a U-phase armature of the motor 2, a W-phase current sensor 4 (corresponding to a current detecting means) for detecting a current IW_s flowing through a W-phase armature of the motor 2, and a position detecting sensor 5 for detecting an electric angle θ of the rotor (not shown) of the motor 2.

The motor control apparatus 1 also has a 3-phase/dq converter 6 (corresponding to an actual current calculating means) for being supplied with the current IU_s, the current IW_s, and the electric angle θ and outputting a d-axis actual current Id_s flowing through the d-axis armature and a q-axis actual current Iq_s flowing through the q-axis armature, a first subtractor 7 for subtracting the d-axis actual current Id_s from a d-axis command value Id_c for the current flowing through the d-axis armature thereby to calculate a d-axis current difference ΔId which is the difference between the d-axis actual current Id_s and the d-axis command value Id_c, and a second subtractor 8 for subtracting the q-axis actual current Iq_s from a q-axis command value Iq_c for the current flowing through the q-axis armature thereby to calculate a q-axis current difference ΔIq which is the difference between the q-axis actual current Iq_s and the q-axis command value Iq_c.

The motor control apparatus 1 further includes a d-axis proportional term component generator 9 for multiplying the d-axis current difference ΔId by a proportional gain Kp thereby to generate a d-axis proportional term component Vd_p, a q-axis proportional term component generator 10 for multiplying the q-axis current difference ΔIq by the proportional gain Kp thereby to generate a q-axis proportional term component Vd_q, an integral term component generator 21 (corresponding to an integral term component generating means) for being supplied with the d-axis current difference ΔId and the q-axis current difference ΔIq and generating a d-axis integral term component Vd_i and a q-axis integral term component Vq_i, and a noninterference processor 18 for outputting noninterference processing term components Vd_n, Vq_n to cancel out the effect of speed electromotive forces that interfere with each other between the d-axis and the q-axis.

The first subtractor 7 and the second subtractor 8 jointly make up a current difference calculating means, and the d-axis proportional term component generator 9 and the q-axis proportional term component generator 10 jointly make up a proportional term component generating means.

The motor control apparatus 1 has a first adder 14 for adding the d-axis proportional term component Vd_p, the d-axis integral term component Vd_i, and the noninterference processing term component Vd_n for the d-axis to each other to calculate a d-axis command voltage Vd_c which is a command value for the voltage applied to the d-axis armature, and a second adder 15 for adding the q-axis proportinal term component Vq_p, the q-axis integral term component Vq_i, and the noninterference processing term component Vq_n for the q-axis to each other to calculate a q-axis command voltage Vq_c which is a command value for the voltage applied to the q-axis armature.

The motor control apparatus 1 also has a dq/3-phase converter 16 for converting the d-axis command voltage Vd_13 c, the q-axis command voltage Vq_c, and the electrical angle θ into three-phase command voltages VU_c, VV_c, VW_c and outputting the three-phase command voltages VU_c, VV_c, VW_c, a power drive unit 17 for being supplied with the three-phase command voltages VU_c, VV_c, VW_c and out-putting frequency-variable voltages depending on the three-phase command voltages VU_c, VV_c, VW_c to the armatures of the motor 2, and an angular velocity processor 19 for differentiating (d/dt) the detected signal of the electrical angle θ from the position detecting sensor 5 to calculate an angular velocity ω of the motor 2 and outputting the angular velocity ω to the noninterference processor 18.

The first adder 14 and the second adder 15 jointly make up a command voltage generating means.

The integral term component generator 21 approximates, with a steady gain M according to the equation (4), the steady input-to-output relationship of the motor 2 which is represented by a block 20 including the d-axis proportional term component generator 9 and the q-axis proportional term component generator 10, for being supplied with the voltage Vd applied to the d-axis armature and the voltage Vq applied to the q-axis armature and outputting the current Id flowing through the d-axis armature and the current Iq flowing through the q-axis armature.

Specifically, the integral term component generator 21 approximates the input-to-output relationship with the steady gain M including the proportional gain Kp as a parameter and also including the angular velocity ω, the resistance r of the d-axis armature and the q-axis armature, the inductance Ld of the d-axis armature, and the inductance Lp of the q-axis armature.

Then, the integral term component generator 21 effects an integrating process on the set of the d-axis current difference ΔId and the q-axis current difference ΔIq using, as an integral gain Ki, a gain for stabilizing the state of the output when the steady gain M, the d-axis current difference ΔId, and the q-axis current difference ΔIq are multiplied, integrated, and fed back.

Specifically, as indicated by the equation (11) shown below, the integral term component generator 21 multiplies the set $(\Delta Id, \Delta Iq)^T$ of the d-axis current difference ΔId and the q-axis current difference ΔIq by the integral gain Ki, as indicated by 11 in FIG. 1, generates the d-axis integral term component Vd_i from the product according to the equation (7) as indicated by 12 in FIG. 1, and generates the q-axis integral term component Vq_i from the product according to the equation (8) as indicated by 13 in FIG. 1.

$$Ki \cdot \begin{pmatrix} \Delta Id \\ \Delta Iq \end{pmatrix} = \begin{pmatrix} k11 & k12 \\ k21 & k22 \end{pmatrix} \begin{pmatrix} \Delta Id \\ \Delta Iq \end{pmatrix} \quad (11)$$

$$= \begin{pmatrix} k11 \cdot \Delta Id + k12 \cdot \Delta Iq \\ k21 \cdot \Delta Id + k22 \cdot \Delta Iq \end{pmatrix}$$

The d-axis integral term component Vd_i generated by the integral term component generator 21 is added to the d-axis proportional term component Vd_p by the first adder 14, and the q-axis integral term component Vq_i generated by the integral term component generator 21 is added to the q-axis proportional term component Vq_p by the second adder 15. The first and second adders 14, 15 input the d-axis command voltage Vd_c and the q-axis command voltage Vq_c represented by the equation (12) shown below to the dq/3-phase converter 16.

$$\begin{bmatrix} Vd\_c \\ Vq\_c \end{bmatrix} = \quad (12)$$

$$\begin{bmatrix} Kp\Delta Id + \int (k11 \cdot \Delta Id + k12 \cdot \Delta Iq) dt - \omega Lq Iq\_s + \omega Ke \\ Kp\Delta Iq + \int (k21 \cdot \Delta Id + k22 \cdot \Delta Iq) dt - \omega Ld Id\_s \end{bmatrix}$$

where ω: the angular velocity of the motor 5, Ld: the inductance of the d-axis armature, Lq: the inductance of the q-axis armature, and Ke: the induced voltage constant.

The third term of the first line on the right side of the equation (12) represents the noninterference processing term component Vd_n for the d-axis, whereas the third term of the second line on the right side of the equation (12) represents the noninterference processing term component Vq_n for the q-axis.

As described above, the integral term component generator 21 performs an integral process based on the integral gain Ki which is determined to stabilize the output state when the steady gain M including the proportional gain Kp according to the equation (3) as a parameter, the d-axis current difference ΔId, and the q-axis current difference ΔIq are multiplied, the product is integrated, and the integrated product is fed back.

By generating the d-axis integral term component Vd_i which is an integral term component of the d-axis command voltage Vd_c and the q-axis integral term component Vq_i which is an integral term component of the q-axis command voltage Vq_c according to the above integral process, it is possible to bring the d-axis actual current Id_s into stable conformity with the d-axis command current Id_c and also bring the q-axis actual current Iq_s into stable conformity with the q-axis command current Iq_c even if the proportional gain Kp is increased to increase the responsiveness of the motor 2.

As a result, variations in the voltage Vd applied to the d-axis armature and the voltage Vq applied to the q-axis armature and increases in the d-axis current difference ΔId and the q-axis current difference ΔIq, both of which variations and increases are caused when the proportional gain is increased to operate the motor at a high rotational speed in the conventional general PI control process, are suppressed, making it possible to control the motor with small variations in the voltages Vd, Vq and good responsiveness even when the motor 2 operates at high rotational speeds.

In the present embodiment, the integral term component generator 21 uses the integral gain Ki determined according to the equation (5). However, the product of a transposed matrix $M^T$ of the steady gain M determined by the equation (9) and a predetermined arbitrary positive definite matrix Q may be used as the integral gain Ki.

Figure 2:
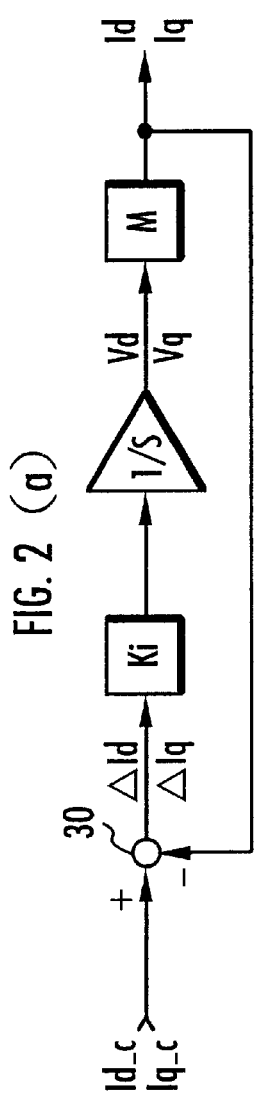
FIGS. 2(a), 2(b), and 2(c) are block diagrams showing various processes of determining an integral gain used in the motor control apparatus shown in FIG. 1.
Figure 2:
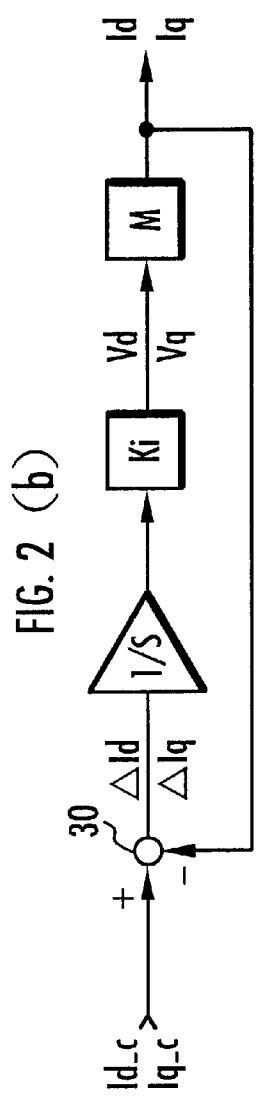
Figure 2:
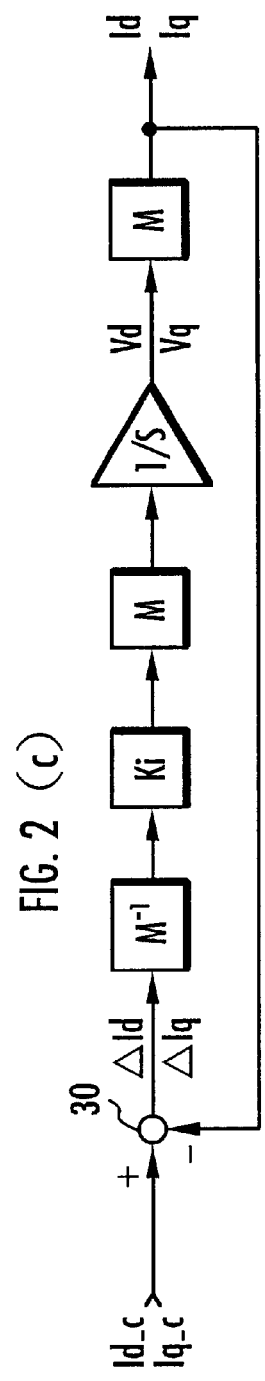
Figure 3:
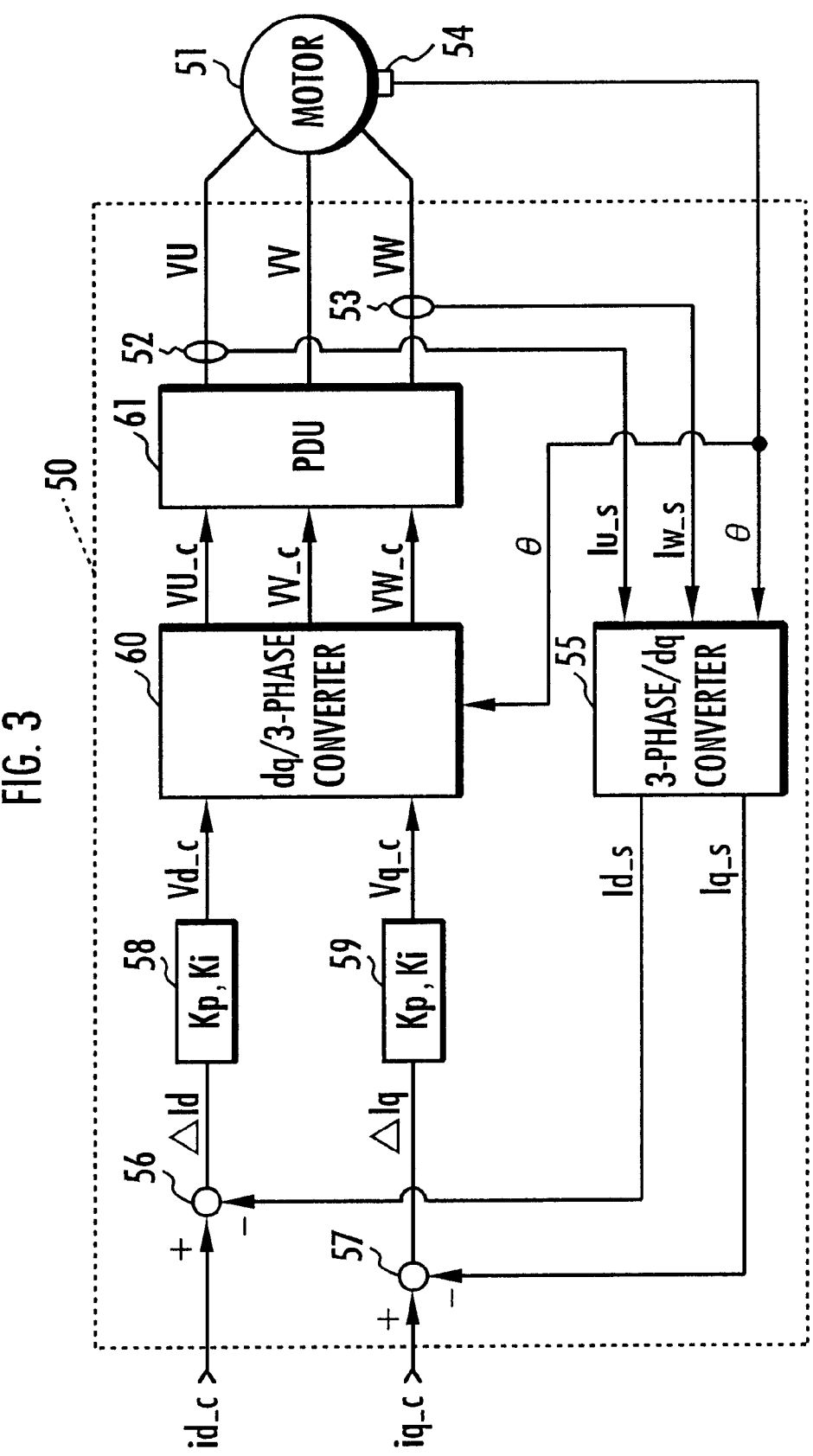
FIG. 3 is a block diagram of a conventional motor control apparatus.

The feedback control system shown in FIG. 2(*a*) may be considered in the form of the state feedback of the integrator as shown in FIG. 2(*b*), and the theory of an optimum regulator may be applied to determine the integral gain Ki. In this case, the state equation of an object to be controlled is expressed as the following equation (13):

$$\begin{cases} \frac{d}{dt} x = Ax + Bu \\ y = Cx \end{cases} \quad (13)$$

where $A = 0, B = M, C = I$.

Therefore, the Riccati's equation can be simplified into the Liapunov's equation expressed by the equation (14)

shown below, and the Liapunov's equation can be solved for its solution P to determine the integral gain Ki according to the equation (15) shown below.

$$-PMR^{-1}M^TP+Q=0 \quad (14)$$

where Q, P, R: arbitrary positive definite matrixes.

$$Ki=-R^{-1}M^TP \quad (15)$$

where R, P: arbitrary positive definite matrixes.

Furthermore, because the stability remains unchanged if the system shown in FIG. 2(b) is converted into a system shown FIG. 2(c), the integral gain Ki may be determined according to the following equation (16):

$$Ki = -M^{-1} \cdot M(M^{-1}R^{-1}M^TP)M^{-1} \quad (16)$$

$$= -detM \cdot M^{-1} \cdot \left\{ \frac{1}{detM} M(MR^{-1}M^TP)M^{-1} \right\}$$

where P, R: arbitrary positive definite matrixes.

Inasmuch as $(-MR^{-1}M^TP)$ is stable due to the positive definiteness of R, P, the above equation (16) has the term within the braces replaced with the stable matrix S according to the equation (5). Alternatively, the stable matrix S may be determined using the solution of the optimum regulator according to the equation (16).

Although certain preferred embodiments of the present invention have been shown and described in detail, it should be understood that various changes and modifications may be made therein without departing from the scope of the appended claims.

What is claimed is:

1. A motor control apparatus for converting a DC brushless motor into an equivalent circuit having a q-axis armature on a q-axis which is aligned with the direction of magnetic fluxes of field systems of the motor and a d-axis armature on a d-axis which extends perpendicularly to the q-axis, comprising:

current detecting means for detecting currents flowing through armatures of the motor;

actual current calculating means for calculating a q-axis actual current flowing through said q-axis armature and a d-axis actual current flowing through said d-axis armature from the currents detected by said current detecting means;

current difference calculating means for calculating a q-axis current difference between a q-axis command current which is a command value for the current flowing through said q-axis armature and said q-axis actual current and a d-axis current difference between a d-axis command current which is a command value for the current flowing through said d-axis armature and said d-axis actual current;

means for generating a d-axis command voltage which is a command value for the voltage applied to said d-axis armature and a q-axis command voltage which is a command value for the voltage applied to said q-axis armature in order to reduce said d-axis current difference and said q-axis current difference;

means for controlling the currents flowing through the armatures of the motor depending on said d-axis command voltage and said q-axis command voltage;

proportional term component generating means for carrying out a proportional process to multiply said d-axis current difference and said q-axis current difference by respective predetermined proportional gains to generate a d-axis proportional term component which is a proportional term component of said d-axis command voltage and a q-axis proportional term component which is a proportional term component of said q-axis command voltage;

integral term component generating means for effecting an integrating process on said d-axis current difference and said q-axis current difference based on a predetermined integral gain to generate a d-axis integral term component which is an integral term component of said d-axis command voltage and a q-axis integral term component which is an integral term component of said q-axis command voltage; and command voltage generating means for generating said d-axis command voltage depending on the sum of said d-axis proportional term component and said d-axis integral term component, and said q-axis command voltage depending on the sum of said q-axis proportional term component and said q-axis integral term component;

means for setting said integral gain to stabilize a system in which said d-axis current difference and said q-axis current difference are multiplexed, integrated, and inputted, with respect to a steady gain which approximates, including said proportional gains, the steady input-to-output relationship of said motor to which the voltage applied to said d-axis armature and the voltage applied to said q-axis armature are inputted and from which the current flowing through said d-axis armature and the current flowing through said q-axis armature are outputted.

2. A motor control apparatus according to claim 1, wherein said steady gain is expressed by the following equation (17), and said input-to-output relationship is expressed by the following equation (18):

$$M = \begin{bmatrix} r+Kp & -\omega Lq \\ \omega Ld & r+Kp \end{bmatrix}^{-1} \quad (17)$$

where M: said steady gain, r: the resistance of said d-axis armature and said q-axis armature, Kp: said proportional gains, Ld: the inductance of said d-axis armature, and Lq: the inductance of said q-axis armature;

$$\begin{bmatrix} Id \\ Iq \end{bmatrix} = \begin{bmatrix} r+Kp & -\omega Lq \\ \omega Ld & r+Kp \end{bmatrix}^{-1} \begin{bmatrix} Vd \\ Vq \end{bmatrix} \equiv M \begin{bmatrix} Vd \\ Vq \end{bmatrix} \quad (18)$$

where Id: the current flowing through said d-axis armature, Iq: the current flowing through said q-axis armature, $\omega$: the angular velocity of said motor, Vd: the voltage applied to said d-axis armature, and Vq: the voltage applied to said q-axis armature.

3. A motor control apparatus according to claim 2, wherein said integral gain is determined by the following equation (19), and said integrating process is carried out according to the following equations (20) and (21):

$$Ki = -detM \cdot M^{-1} S \equiv \begin{pmatrix} k11 & k12 \\ k21 & k22 \end{pmatrix} \quad (19)$$

where Ki: said integral gain, detM: the matrix equation of the steady gain M according to said equation (17), and S: a predetermined arbitrary stable matrix;

$$Vd\_i = \int (k11 \cdot \Delta Id + k12 \cdot \Delta Iq) dt \quad (20)$$

$$Vq\_i = \int (k21 \cdot \Delta Id + k22 \cdot \Delta Iq) dt \quad (21)$$

where Vd_i: said d-axis integral term component, Vq_i: said q-axis integral term component, $\Delta$Id: said d-axis current difference, $\Delta$Iq: said q-axis current difference, k11, k12, k21, k22: matrix elements of the integral gain Ki defined by said equation (19).

4. A motor control apparatus according to claim 2, wherein said integral gain is determined by the following equation (22), and said integrating process is carried out according to the following equations (23) and (24):

$$Ki = M^T Q \equiv \begin{pmatrix} k11 & k12 \\ k21 & k22 \end{pmatrix} \quad (22)$$

where Ki: said integral gain, M: the steady gain according to said equation (17), $M^T$: a transposed matrix of M, and Q: a predetermined arbitrary positive definite matrix;

$$Vd\_i = \int (k11 \cdot \Delta Id + k12 \cdot \Delta Iq) dt \quad (23)$$

$$Vq\_i = \int (k21 \cdot \Delta Id + k22 \cdot \Delta Iq) dt \quad (24)$$

where Vd_i: said d-axis integral term component, $Vq_{13}$ i: said q-axis integral term component, ΔId: said d-axis current difference, ΔIq: said q-axis current difference, k11, k12, k21, k22: matrix elements of the integral gain Ki defined by said equation (22).

* * * * *